Nov. 4, 1958     E. A. GLUTTING     2,858,610

PARING AND SLICING KNIVES

Filed July 1, 1957

INVENTOR.
EARL A. GLUTTING
BY
Attorney

United States Patent Office 2,858,610
Patented Nov. 4, 1958

2,858,610

PARING AND SLICING KNIVES

Earl A. Glutting, Detroit, Mich.

Application July 1, 1957, Serial No. 669,105

1 Claim. (Cl. 30—279)

This invention relates to improvements in paring and slicing knives. At the present time it is customary to make the opposite sides of the blades of such knives parallel to one another from their cutting edges throughout their depth. However, if such a knife is utilized for cutting such produce as butter or cheese for instance, some of the produce usually adheres to the sides of the blade and is wasted and the cut slice presents a ragged and unappetizing appearance. Again when such a knife is employed for slicing, say, large raw potatoes or carrots, very considerable frictional resistance must be overcome due to the fact that the vegetable being cut binds against the opposite sides of the blade throughout substantially the entire depth of the latter.

It is an object of the invention to provide a paring and slicing knife to which such produce as butter or cheese will not stick, so that clean, appetizing slices may be cut thereby, without fear of some of the produce sticking to the blade.

Another object of the invention is to provide a paring and slicing knife wherein the blade is so shaped that pressure is only exerted against a relatively small portion thereof by the material being cut, thereby minimizing the frictional resistance offered to the movement of the blade.

With these and other objects and advantages in view, which will become apparent as the specification proceeds, the invention is hereinafter more fully described with the aid of the accompanying drawing, in which.

Figure 1:
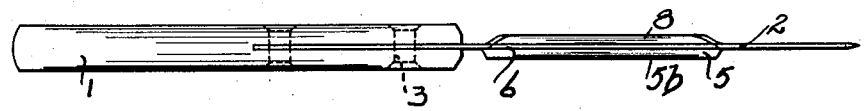
Figure 1 is a plan view of the invention.
Figure 2:
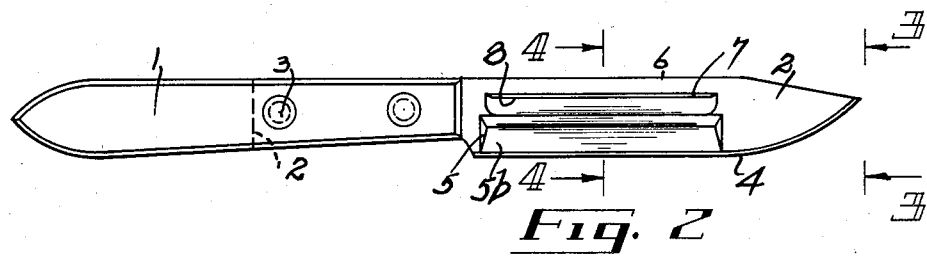
Figure 2 is a side elevation.
Figure 3:
Figure 3 is an enlarged front elevation thereof.
Figure 4:
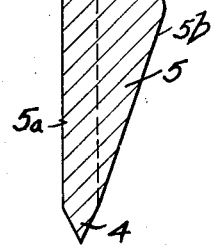
Figure 4 shows a section, considerably enlarged, taken on the line 4—4 of Figure 2.

Referring to the drawing, 1 designates a conventional handle which is longitudinally slotted from one end intermediately of its width to receive one extremity of a blade 2 which is secured therein as by rivets 3. Extending from the handle 1 to the outer extremity of the blade 2 along one longitudinal margin thereof is a cutting edge 4.

Formed integral with the blade 2 intermediately of its length is a wedge-shaped portion 5. This portion, which is of increasing width upwardly from the cutting edge 4 and transversely of the blade for a portion of the height of the latter, extends longitudinally from adjacent the handle 1 to within a short distance of the outer extremity of the cutting edge. One side 5a of the wedge-shaped portion is in alignment with and forms a continuation of one side 2a of the blade, and the opposite side 5b of the wedge-shaped portion projects from the cutting edge at an upward and outward inclination relative to the vertical axis of the blade.

Formed through the blade 2 adjacent and parallel with the back longitudinal edge 6 thereof is a slot 7 which is spaced above the wedge-shaped portion 5 and is substantially the same length as the latter. A lip 8 forming the underside of the slot 7 is laterally offset relative to the vertical axis of the blade so that throughout its length its upper margin is substantially the same distance from the said verical axis in one direction as the outer face 5b of the wedge-shaped portion projects in the opposite direction. The inner face of the lip 8 is downwardly and inwardly inclined across the vertical axis of the blade and extends outwardly thereover across the upper face of the wedge-shaped portion to the outer side 5b of the latter. The outer face of the lip is downwardly and laterally inwardly inclined to merge with the upper extermity of the side 5a of the wedge-shaped portion.

Thus the provision of the lip 8 and the wedge-shaped portion 5, which project the same distance from but on opposite sides of the vertical axis of the blade, retain the partly cut sides of the material being severed spaced from the blade throughout the major portion of the height of the latter, thereby reducing the frictional resistance exerted against movement of the blade; and, as previously stated, this form of blade materially reduces, in fact practically eliminates, the tendency for such produce as butter or cheese to crumble when being cut. However if a fragment should be broken off by the tapered face 5b it passes from the top of the wedge-shaped portion into the lip 8 whence it is freely removable.

While in the foregoing the preferred embodiment of the invention has been described and shown, it is understood that alterations and modifications may be made thereto provided the said alterations and modifications fall within the scope of the appended claims.

What I claim is:

A peeling and slicing knife comprising an attenuated blade provided along one margin with a cutting edge terminating at one end in a point, a handle attached to the other end of said blade, said blade being provided with a slot extending longitudinally thereof and having opposed parallel edges, an enlarged wedge-shaped projection on said blade extending from the cutting edge and offset to one side of the plane thereof to provide a slice removing and guiding surface extending and terminating below said slot, a longitudinally extending rib on the other side of said blade projecting outwardly from one edge of said slot and over said slot with its free edge in offset spaced relation to the other edge of said slot, the outer end of said rib being sharpened to provide a cutting edge, and the inner surface of said rib forming a continuation with a surface of said wedge-shaped projection and merging therewith to provide a slice removing surface.

References Cited in the file of this patent

UNITED STATES PATENTS

| 63,236 | Force | Mar. 26, 1867 |
| 343,522 | Jordan | June 8, 1886 |
| 1,667,596 | Kapota | Apr. 24, 1928 |
| 2,178,267 | Potstada | Oct. 31, 1939 |
| 2,570,671 | Hartman | Oct. 9, 1951 |

FOREIGN PATENTS

| 84,669 | Sweden | Oct. 22, 1935 |